United States Patent [19]
Kashio

[11] 3,925,641
[45] Dec. 9, 1975

[54] ROUTE GUIDING APPARATUS

[75] Inventor: Toshio Kashio, Tokyo, Japan

[73] Assignee: Casio Computer Co., Ltd., Higashiyamato, Japan

[22] Filed: May 3, 1974

[21] Appl. No.: 466,701

[30] Foreign Application Priority Data
May 8, 1973 Japan.................. 48-50915

[52] U.S. Cl. ............ 235/150.2; 235/150.24; 340/22
[51] Int. Cl.² .......................................... G06F 15/50
[58] Field of Search......... 235/150.2, 151.2, 150.24; 340/22, 23, 24, 27

[56] References Cited
UNITED STATES PATENTS

| | | | |
|---|---|---|---|
| 3,653,538 | 4/1972 | Lamar............................... | 235/150.2 |
| 3,681,752 | 8/1972 | Cuddihy............................. | 340/24 |
| 3,824,534 | 7/1974 | Straumsnes........................ | 340/24 |
| 3,845,289 | 10/1974 | French............................. | 235/150.2 |

OTHER PUBLICATIONS
Programmed Driving Gets a Road Test in Germany, Electronics (International), July 19, 1971, p. 125.

Rosen et al.: An Electronic Route–Guidance System for Highway Vehicles, IEEE Transactions on Vehicular Technology, Vol, VT–19, No. 1, Feb. 1970, pp. 143-152.

*Primary Examiner*—Felix D. Gruber
*Attorney, Agent, or Firm*—Flynn & Frishauf

[57] ABSTRACT

A route guiding apparatus mounted on an automobile which automatically indicates a distance to a particular point on a route as well as a direction in which the automobile should continue its run at said point, namely, whether it should turn to the right or left or advance straight forward, and wherein the indicated distance decreases as the automobile advances and is finally reduced to zero at said point. Data corresponding to the course to be taken by the automobile at said point and corresponding to a distance between two adjacent points is stored in a memory device of said apparatus, and data corresponding to said course and distance is supplied as the automobile proceeds from a device for generating data on its actual run or data previously obtained, for example, from a map by operating a key input device.

15 Claims, 7 Drawing Figures

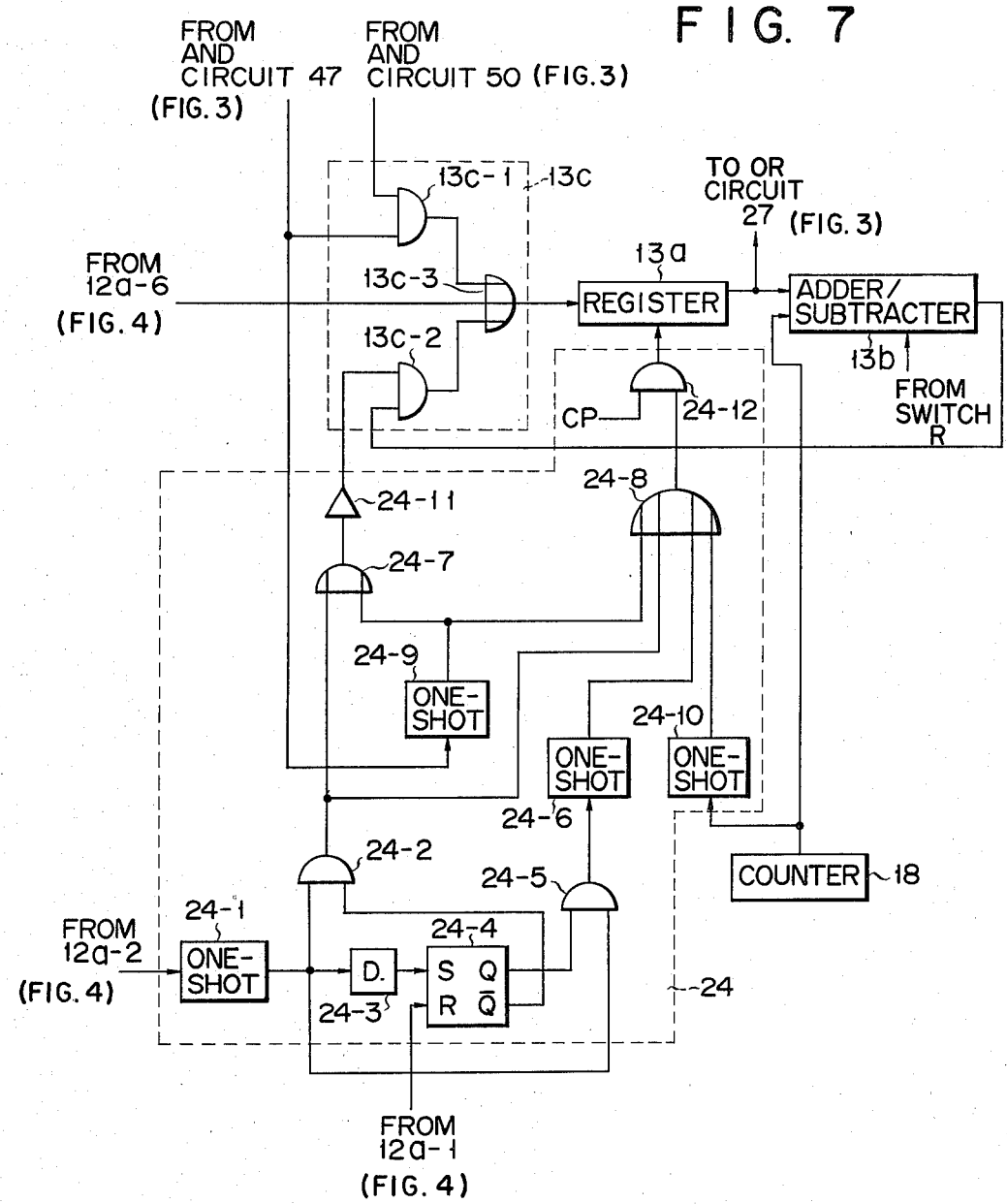

ROUTE GUIDING APPARATUS

BACKGROUND OF THE INVENTION

This invention relates to a route guiding apparatus used with vehicles such as an automobile or bicycle so as to successively guide the vehicle over a route up to a destination.

Where a man travels, for example, by automobile, in an area in which he is unfamiliar, he must run the automobile while often confirming a route to his distination with reference to a map or road marks. However, a look at a map during an actual drive is practically impossible from the standpoint of traffic safety. Further, it is impossible to ascertain minor junctions and turns from a map. Even if the driver reaches his destination with reliance on a map, he will suffer considerable difficulty on his return trip due to his inaccurate memory of the route which he has previously passed and the illusion arising from the necessity of traveling on said route in a reverse direction, as many drivers often experience. Even with respect to a route over which a driver has once passed back and forth, details of said route will often be forgotten, causing a great deal of difficulty when he again travels to the same destination over said roadway. Also, many persons experience great difficulties in explaining the details of a route to a given destination to a driver who is going there for the first time.

SUMMARY OF THE INVENTION

It is accordingly the object of this invention to provide a route guiding apparatus designed automatically to indicate the respective courses of a route to a driver's destination in succession. This object is attained by providing a route guiding apparatus which comprises a memory device storing data corresponding to a distance to a particular point on a route and data corresponding to a direction in which the driver should continue his travel at said point, namely, whether he should turn to the right or left or go straight forward; means for informing the driver of data corresponding to the distance and direction successvely read out of the memory device for each succeeding course of the route; a device for storing in the memory device data corresponding to the distance already covered by the driver and the direction in which he should continue his travel; and a device for storing in the memory device data obtained, for example, from a map by the driver before he starts on a trip.

BRIEF DESCRIPTION OF THE DRAWINGS

FIG. 7 shows the detailed concrete circuit of the gate circuit and shift control device shown in FIG. 3.

DESCRIPTION OF THE PREFERRED EMBODIMENTS

Figure 1:
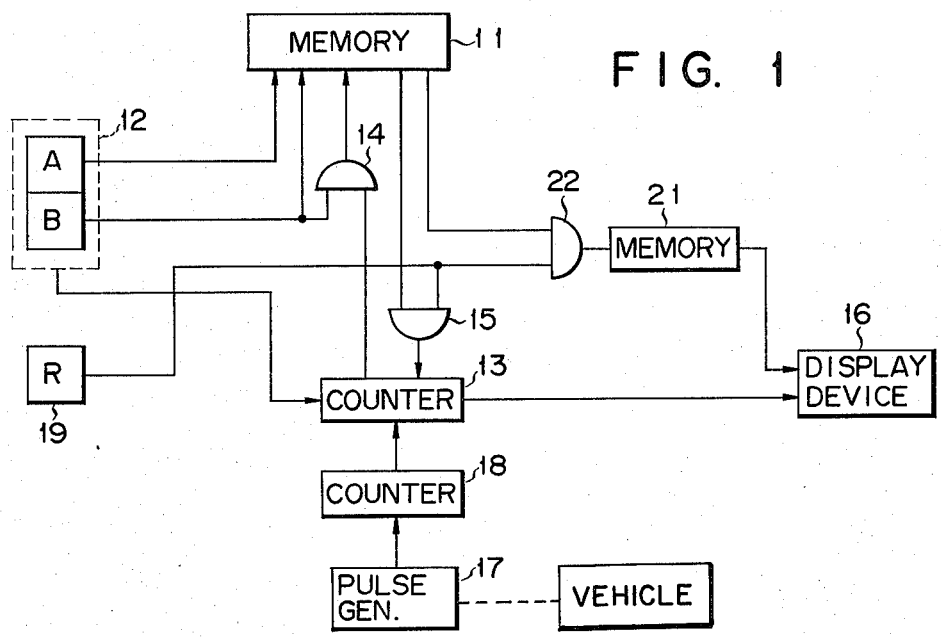
FIG. 1 is a block circuit diagram schematically showing the arrangement of the route guiding apparatus of this invention.

The route guiding apparatus comprises a memory device 11 which is stored with a combination of data corresponding to a distance being covered by a driver in a particular course of a route to his destination and function data corresponding to the driver's traveling direction corresponding to said distance, namely, on whether the driver should turn to the right or left or go straight on before he enters the succeeding coursse of the route. Other function data such as data corresponding to the particular point like a post office, store etc. is also usable but the data corresponding to the direction will be used throughout the description of this specification. Where the display device indicates, for example, "12.3 km" and "right turn," these indications collectively illustrate a route guide advising a driver to turn to "the right" when he has run "12.3 km." Data stored in the memory device 11 is supplied from an input device 12. This input device 12 includes two input sections A and B. The section A is a system for storing in the memory device 11 detailed data previously obtained, for example, from a map by means of a push-button input key, or a magnetic or optical means using a card or tape. The section B is a system for storing in the memory device 11 data corresponding to a distance covered by a vehicle provided with the subject route guiding apparatus. The data recording system of section A has a generally known means for storing in the electronic memory device data corresponding to numerals denoting distances covered by the vehicle or data corresponding to the directions such as the right or left turn or straight forward run in a coded form through an operation key, or another magnetic or optical recording means using a card or tape as a recording medium.

There will now be described the recording system of section B in the above-mentioned input device 12 for recording data corresponding to a distance actually covered by a vehicle equipped with the subject route guiding apparatus. This apparatus comprises a pulse generator data source 17 for obtaining data corresponding to an actually covered distance. This pulse generator data source 17 is coupled with the drive mechanism of the vehicle and comprises a pulse generator interlocking with, for example, a mechanical range finder to provide data corresponding to a distance actually covered by the vehicle. The pulse generator 17 gives forth one pulse for each unit distance coverage, and may be formed by provision of, for example, a mechanical, magnetic or optical switch. Pulses from said pulse generator or data source 17 is supplied to a counter device 18 for digitally counting said pulses. If the counter 18 is taken to be a ternary type which indicates upon receipt of, for example, three pulses from the pulse generator 17 that the vehicle has run 100 meters, then said counter 18 generates one carry signal per 100 meters. Therefore, data in the counter 18 indicates a distance covered by the vehicle in units of 100 meters.

Where the section B is used, the input device 12 is operated, while measuring a distance actually covered by the vehicle. Where the driver approaches a turning point or a straight-advancing point to which he should pay particular attention, said input device 12 additionally makes a directional indication such as "right," "left" or "straight" (said indication may be given interlocking with the direction indicator of, for example, an automobile). The section B of the input device 12 gives forth a signal corresponding to the above-mentioned directional indication. This signal is transmitted to an AND circuit 14 as a gating signal and also to the memory device 11 as data on a direction. Data corresponding to a distance counted by the counter device 13 is stored in the memory device 11 and thereafter data on a direction delivered from the input device 12 is stored therein. In this case, counts made by the counter 13 are cleard, the moment said data is stored in the memory device 11, thereby rendering the counter 13 ready to count a fresh distance being actually covered by the vehicle, starting with the already measured point. Thus, the memory device 11 is repeatedly stored with data corresponding to the respective courses of a route expressed in a prescribed unit of distance as well as with data corresponding to the various directions in which the driver should run his vehicle before entering each succeeding course of the route. Namely, the memory device 11 is successively stored with both types of data by either the A or B input system. Various data is read out from the memory device 11 in turn to act as route guide information.

There will now be described the read-out means. Read-out is effected successively beginning with the starting or terminal point of the route according to instructions on an outward or a return trip. Data corresponding to distances is written in a counter device 13 and indicated on a display device 16. Data corresponding to directions is read out of a directional data memory device 21 at the same time as distance data and also indicated on the display device 16. Said display is carried out by a read-out instruction device 19, which supplies a gating signal to AND circuits 15, 22 provided in circuits for giving forth signals denoting data corresponding to the distances and directions. Instructions corresponding to the above-mentioned read-out are given in the same manner as by the input section B, namely, when the driver approaches a specified point such as a turning point or a straight-advancing point to which the driver should pay particular attention.

Judgement of said specified point is made in the following way. Now let it be assumed that the display device 16 indicates the distance of the first course of the route expressed in a prescribed unit and said distance data is stored in the counter device 13, for example, said indication reads "Turn to the right at 12.3 km." Under this condition, a driver continues his run along said particular course of the route, and a generator 17, which gives forth a pulse denoting the driver's actual run supplies a signal to the counter device 18 which in turn delivers a signal to the counter device 13. When set for read-out, the counter device 13 is designed to make deductions according to a carry signal from the counter device 18, causing the counts already stored in said device 13 to be decreased progressively as the driver's vehicle runs onward. At this time, the counter device 13 is stored with data corresponding to the remaining distance of said particular course which the driver should cover until he reaches the above-mentioned "right turn" point. Said remaining distance is also indicated on the display device 16, making the driver aware of his approach to said "right turn" point. If there is further provided a proper warning means, for example, a means for flickering indications on the display device 16 or giving an alarm, then the driver's attention will be more effectively called to his approach to the "right turn" point, when the remaining distance falls to below a certain level.

Where the read-out instruction device 19 is operated when the remaining distance closely approaches zero or, immediately after the zero is reached, the driver just enters the succeeding course of the route requiring instructions corresponding to a new direction, then data corresponding to the distance of said succeeding course and data corresponding to the direction in which the driver should run his vehicle at the end of said course are read out of the memory device 11. Thereafter the same route guiding operation is repeated until the driver reaches his destination.

Accordingly, the route guiding apparatus arranged as described above has the following advantages:

a. If known data obtained, for example, from a map, which data is stored in the memory device 11 by means of a key input device, a driver can be guided through a route to a district of which he has been uninformed or is unfamiliar with.

b. A route guide can be provided by magnetically or optically recording data corresponding to a driver's route in a card or tape and storing said data in the memory device 11 where required.

c. If the memory device 11 is stored with data obtained by a driver corresponding to the route of his outward trip while he is actually running his vehicle along said route, then said memory device 11 can be used to guide him in his back trip.

d. Data corresponding to the route of the driver's outward trip obtained by his actual run not only serves the purpose of guiding him in his back trip but also informs him of the details of said route when he goes to and comes back from the same destination through said route for the second time, or show said details to another person who is going to travel to said destination without any prior knowledge.

To attain the above-mentioned advantages, it is necessary to store the memory device 11 with all data corresponding to a driver's route so as to enable any peice of said data to be drawn out at any time desired. To this end, it is possible to record data obtained from the memory device 11 magnetically or optically in a card or tape. A much simpler method is to record, for example, on a sheet of paper the data previously obtained by the actual run of a driver's vehicle through his route, such as "12.3 right," "5.8 right" or "25 left," while presenting said data on the display device 16 in the same manner as when the driver's vehicle is actually run and store such contents of data in the memory device 11 by the aforesaid A input system to guide the driver about the same route later when he travels back and forth therethrough for the second time.

The route guiding apparatus of this invention effectively plays the role of guiding a driver by storing the exact distances of the respective courses of his route and the directionin which he should run his vehicle just before entering these courses. Obviously, more accurate guidance can be attained by a combination of such guiding data and reference to a separately provided map or the certain memory of the driver with respect to the conditions of a turning point.

Figure 2:
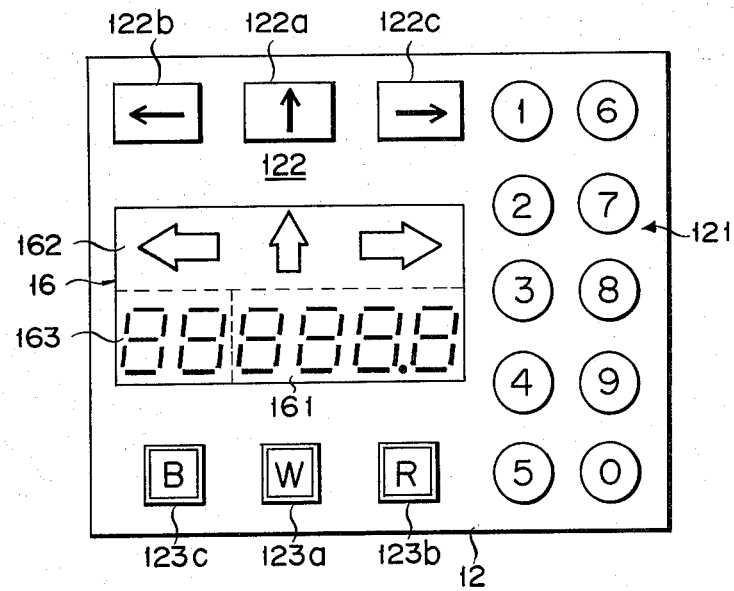
FIG. 2 is a plan view of an input device or display control panel included in the route guiding apparatus to FIG. 1.

FIG. 2 illustrates an input device or display control panel 12. Provided on this display control panel 12 are digit buttons 121 for enabling storage of the already known distances of the respective courses of a driver's route; buttons for enabling storage of guiding directions 122a, 122b, 122c; control switches 123a, 123b, 123c associated with write-in, read-out and selection of an outward or back trip; and a display device 16 comprised of a section 161 for indicating the distances of the respective courses of the driver's route in numbers, a section 162 for indicating guiding directions and a section 163, provided if necessary, for indicating the sequential orders of the respective courses (or the addresses of the memory device 11).

Figure 3:
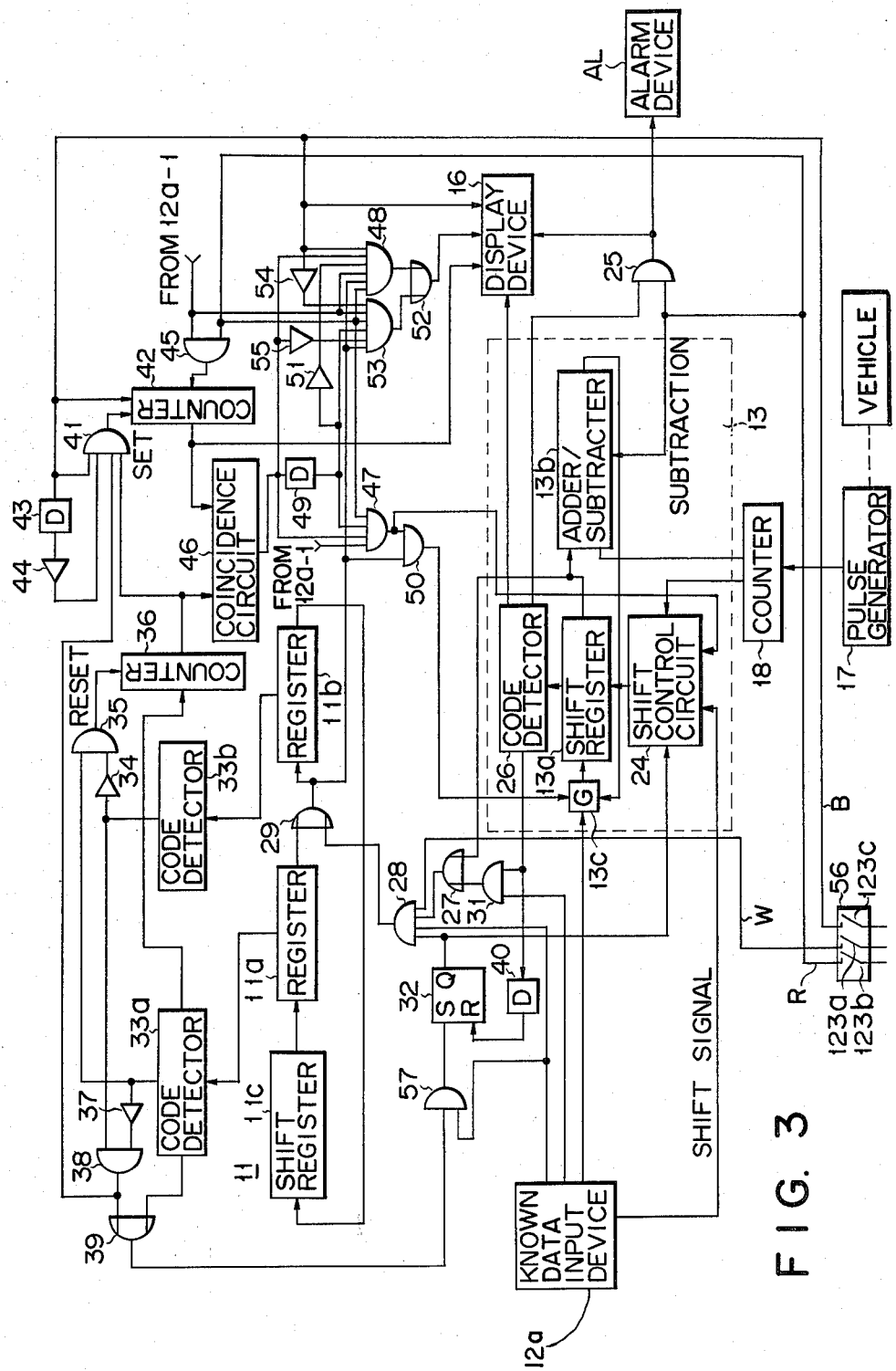
FIG. 3 shows the block circuit diagram of the detailed concrete circuit arrangement of the apparatus of FIG. 1.

FIG. 3 shows the detailed concrete circuit arrangement of a route guiding apparatus according to an embodiment of this invention. The memory device 11 includes, for example, a shift register 11c which constitutes a series shift circuit together with auxiliary registers 11a, 11b each having a capacity to be stored with data corresponding to one word. The input device 12 comprises a known data input device 12a including the digit buttons 121 and direction buttons 122a, 122b, 122c of FIG. 2 and a pulse generator 17 for supplying data corresponding to the actual run of, for example, an automobile obtained by rotations of the wheels thereof. The known data input device 12a is designed to supply not only numerical data corresponding to distances but also data corresponding to the corresponding directions. The counter circuit 13 consists of, for example, a static shift register 13a and an addition-subtraction device 13b, shift circulation taking place through said both elements 13a, 13b and a control gate circuit 13c under control of a shift control circuit 24. Numerical data from the known data input device 12a is stored through the control circuit 13c. A counter 18 generates a carry signal for each prescribed unit of distance covered by, for example, an automobile upon receipt of a signal from the pulse generator 17. Said carry signal is conducted to the addition-subtraction device 13b. At this time, output signals from the input device 12a, pulse generator 17 and counter 18 and the corresponding shift-instructing signals are supplied to the shift control circuit 24. In this case, the addition-subtraction device 13b normally carries out addition upon receipt of a signal from the counter 18, and effects subtraction only when the switch 123b gives forth a read-out-instruction signal R. Said read-out switch 123b is provided on the display control panel of FIG. 2 as part of the input device 12 together with the other switches 123a, 123c.

There will now be described by referenct ot FIG. 4 the concrete circuit arrangement of the known data input device 12a. Three outputs from the direction data input switches 122a, 122b, 122c shown in FIG. 2 are supplied to an OR circuit 12a-1 and an encoder 12a-3. Also, ten outputs from the distance data input device 121 shown in FIG. 2 are supplied to an OR circuit 12a-2 and encoder 12a-3. The direction data signal and the distance data signal supplied to the encoder 12a-3 are converted into 4-bit coded signals weighted by 1-2-4-8. The output signal of the encoder 12a-3 is coupled to the respective one input terminals of AND circuits 12-5, 12a-6 through an OR circuit 12a-4. Since the output terminal of the OR circuit 12a-1 is connected to the other terminal of the AND circuit 12a-5, a direction instructing signal is supplied from the OR circuit 12a-1 to AND circuits 28, 57, and a coded direction data signal is supplied from the AND circuit 12 a-5 to the AND circuit 31. Because the output terminal of the OR circuit 12a-2 is connected to the other input terminal of the AND circuit 12a-6, a shift instructing signal is supplied from the OR circuit 12a-2 to a one-shot 24-1 (hereinafter described) of the shift control circuit 24, and a coded distance data signal is supplied to an OR circuit 13c-3 (hereinafter described) of the control gate circuit 13c from the AND circuit 12a-6.

The shift register 13a is provided with a coded numeral detecting circuit 26, causing numerals stored in the shift register 13a to be indicated on the display device 16. Where a coded numeral falls to below a specified level, said coded numeral detecting circuit 26 supplies a signal to an AND circuit 25 whose gate is opened upon receipt of a read-out-instructing signal R, thereby flickering indications on the display device 16 or giving a warning by sounding the alarm member of an alarm device AL.

An output data signal from the shift register 13a included in the counter circuit 13 is supplied to an OR circuit 29 interposed between the auxiliary registers 11a, 11b through an OR circuit 27 and AND circuit 28, so as to be written in the memory device 11. An AND circuit 31 whose gate is opened by a nonnumerical data signal from the detecting circuit 26 is supplied with a coded direction data signal from the known data input device 12a. An output from the AND circuit 31 is transmitted to the AND circuit 28 through the OR circuit 27 to be also written in the memory device 11. In this case, the AND circuit 28 has its gate opened upon receipt of a write-in instructing signal W from the switch 123a, a direction instructing signal from the input device 12a and a Q-output from a flip-flop circuit 32.

The auxiliary registers 11a, 11b following the shift register 11c are provided with the corresponding code detectors 33a, 33b. The code detector 33a produces an output signal when a coded numeral is stored in the register 11a and also when no coded numeral is stored therein during the period of one cycle of shifting in said memory 11, in case a directional signal is detected. The code detector 33b gives forth an output signal when the register 11b is stored with a coded numeral. An output signal from the code detector 33a denoting the presence of a coded numeral and an output signal supplied from the detector 33b through an inverter 34 are conducted to an AND circuit 35, which generates a signal upon the arrival to the register 11a of the foremost word of data stored in the memory device 11 so as to reset a counter 36 making counts upon receipt of a signal from the code detector 33a denoting the detection of directional data. The counter 36 makes counts in the sequential order of addresses of data brought to the auxiliary register 11a, namely, in the sequential order of the respective courses of a driver's route. An output signal from the memory device 11 is drawn out of the OR circuit 29 in synchronization with any count made by the counter 36. An output signal from the code detector 33b and an output signal from the code detector 33a denoting the presence of a coded numeral in the corresponding auxiliary register 11a which has passed through an inverter 37 are both supplied to an AND circuit 38, which produces an output signal when the register 11b is stored with the last word of data stored in the memory device 11. Said output signal from the AND circuit 38, or an output signal from the code detector 33a denoting the absence of shifting in the corresponding auxiliary register 11a, is delivered to the set terminal of the flip-flop circuit 32 through an OR circuit 39 and AND circuit 57. When the detecting circuit 26 included in the counter circuit 13 generates an output signal denoting the absence of a coded numeral, the flip-flop circuit 32 is reset through a delay circuit 40 after a prescribed length of time.

Figure 5:
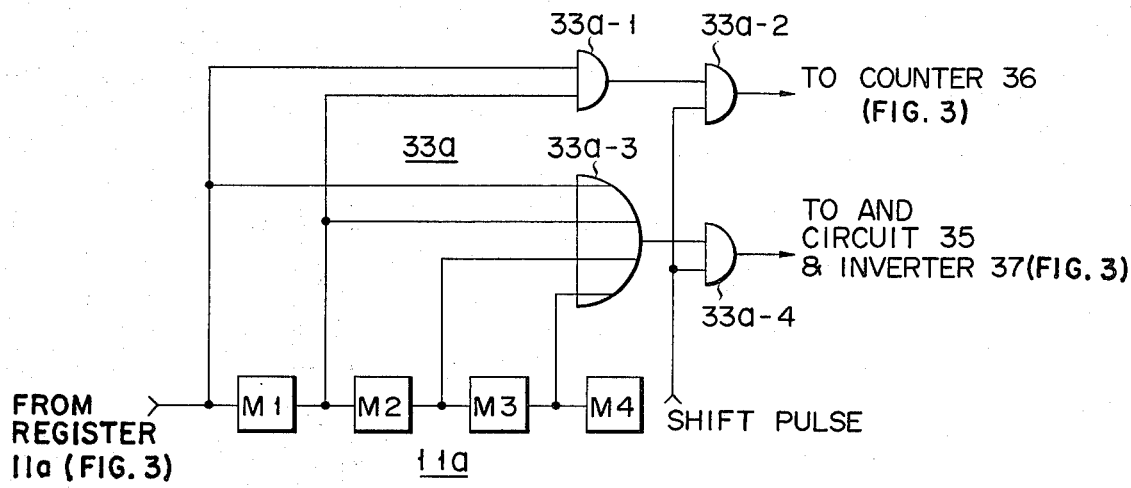
FIG. 5 is a block circuit diagram illustrating a direction data-detecting device included in the apparatus of FIG. 3.

There will now be described by reference to FIG. 5 the concrete circuit arrangement of the code detector 33a. Now let it be assumed that any word of data stored in the register 11a consists of four bits and that data corresponding to directions such as "left turn," "right turn" and "straight advance" are designated by codes (1101), (1110) and (1111) respectively. According to this assumption, the first two bits of the respective codes are chosen to consist of (11) bits. Referring to FIG. 5, an AND circuit 33a-1 detects that an input of bit 1 is supplied to the input terminal of each of the first two bit memories M1, M2 of the four bit memories M1 to M4 of the register 11a. When an output signal from the AND circuit 33a-1 is drawn out through another AND circuit 33a-2 whose gate is opened upon receipt of a shift pulse, then the counter 36 gives forth an output signal denoting that the register 11a is stored with data corresponding to a direction.

Further, if numerical data on a distance is coded by four bits weighted by 1-2-4-8, then the presence of a 1 signal on the input side of any of the four bit memories M1 to M4 shows that the register 11a is stored with data corresponding to a distance. When a signal on the input side of any of the bit memories M1 to M4 is drawn out through an OR circuit 33a-3 and thereafter an output signal from said OR circuit 33a-3 is drawn out through another AND circuit 33a-4, then a signal denoting the presence of data corresponding to a distance in the register 11a is delivered to the AND circuit 35 and inverter 37.

Now returning to FIG. 3, a signal denoting the counts made by the counter 36 is supplied as a set signal to a counter 42 through an AND circuit 41. In this case, the AND circuit 41 has its gate opened upon receipt of an output signal from the AND circuit 38, a signal B from the switch 123c denoting a driver's return trip and an output signal from a delay circuit 43 which has passed through an inverter 44. When a return trip-instructing signal is generated and the counter 36 has counted all the courses of a driver's route already stored in the memory device 11, then the counter 42 is set at a number thus counted. Upon receipt of a return trip instructing signal, the counter 42 is set for subtraction and commences subtraction when a direction-instructing signal is obtained from an AND circuit 45 whose gate is opened by a read-out-instructing signal R.

Output signals from the counters 36, 42 are transmitted to a coincidence-detecting circuit 46, which gives forth an output signal when coincidence takes place between the counts made by both counters 36, 42. A coincidence output signal from the coincidence-detecting circuit 46 is delivered to AND circuits 47, 48. The AND circuit 47 is further supplied with a direction-instructing signal, an output from a delay circuit designed to delay the above-mentioned coincidence signal by one word time and read-out-instructing signal R. An output signal from the AND circuit 47 is supplied to the shift control circuit 24 as a shift-instructing signal and also to an AND circuit 50 as a gating signal. This AND circuit 50 conducts an output data signal from the OR circuit 29 of the memory device 11 to the control circuit 13c of the counter circuit 13 so as to be stored therein.

The AND circuit 48 is supplied with not only an output signal from the coincidence-detecting circuit 46, reference to a back trip-instructing signal B, an output signal from the delay circuit 49 which has passed through an inverter 51, a direction-instructing signal from OR circuit 12a-1, read-out-instructing signal R and a data signal from the OR circuit 29. The AND circuit 48 gives forth only data corresponding to a direction included in the data signal from said OR circuit 29 and delivers said directional data as a guide for directions to the display device 16 through an OR circuit 52. Said directional guide signal instructs a driver to turn to the right or to the left or go straight on. In the case of a return trip, directional data read out by a return instruction supplied to the display device 16 is reversed. 12a example, data corresponding to "right turn" is displayed in the form reversed to "left turn" and data corresponding to "left turn" in the form reversed to "right turn." The AND circuit 48 has a parallel arranged AND circuit 53, which is supplied with not only an output data signal from the OR circuit 29, but also a return trip-instructing signal B which has passed through an inverter 54, a coincidence signal which has passed through an inverter 55, an output signal from the delay circuit 49, a direction-instructing signal from OR circuit 12a-1 and a read-out-instructing signal R. An output signal from the AND circuit 53 is delivered to the OR circuit 52.

Figure 6:
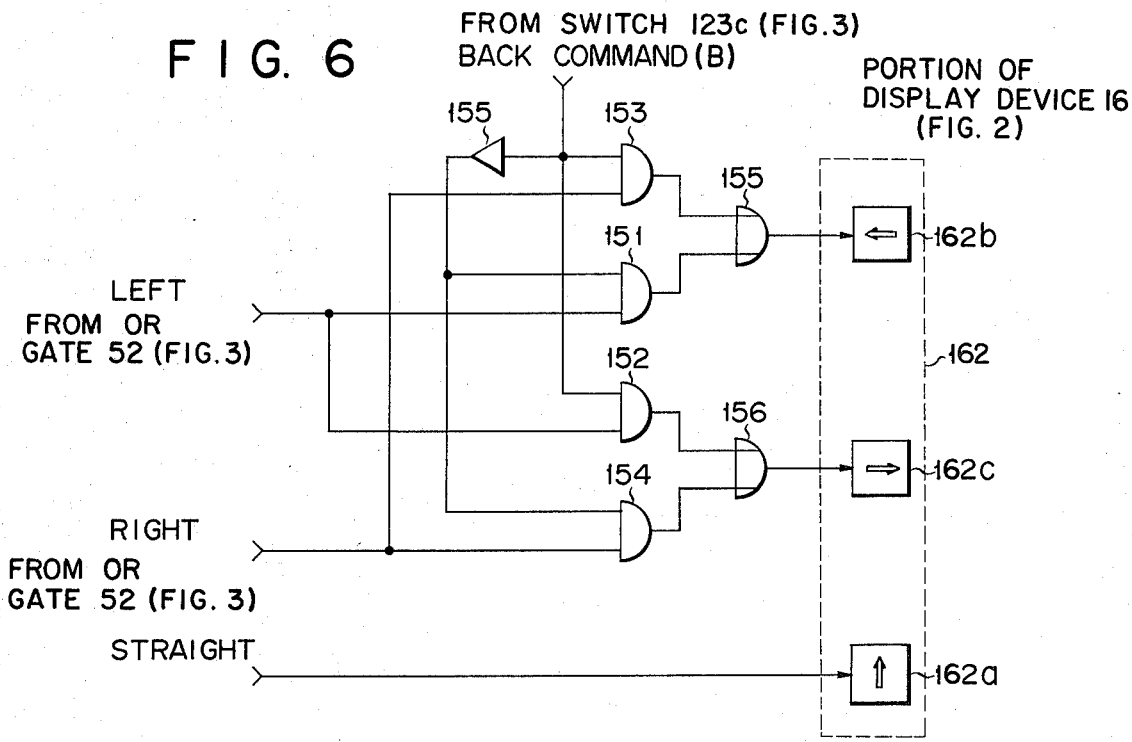
FIG. 6 is a block circuit diagram illustrating a right-left reversion circuit included in the display device of FIG. 3.

FIG. 6 illustrates the concrete arrangement of a direction reversing circuit included in the display device 16. Data corresponding to "left turn" included in the directional data delivered from the OR circuit 52 is conducted to one of the input terminals of AND circuits 151, 152 respectively, and data corresponding to "right turn" is supplied to one of the input terminals of AND circuits 153, 154 respectively. A return trip-instructing signal B (a back command) is transmitted to the other of the input terminals of the AND circuits 152, 153 and then through an inverter 155 to the other of the input terminals of the AND circuits 151, 154. Data corresponding to "straight advance" is directly sent to the "straight advance" display device 162a. In the absence of a back command B, data corresponding to "left turn" and "right turn" are supplied to the "left turn" and "right turn" display devices 162b, 162c respectively through the corresponding AND circuits 151, 154 and OR circuits 155, 156. In the presence of the back command B, data on "left turn" and "right turn" are conducted conversely to the "right turn" and "left turn" display devices 162c, 162b.

Where the memory device 11 is stored with a combination of data corresponding to the distances of the respective courses of a driver's route expressed in a prescribed unit and data corresponding to the directions in which a driver should run his vehicle just before entering each succeeding course, distance data and the following directional data are read out in the case of an outward trip from the AND curcuit 53, while in the case of a return trip, directional data preceding distance data is drawn out of the AND circuit 48. The reason is that when the memory device 11 is initially stored with data corresponding to a driver's route in the order of distance-direction-distance-direction for an outward trip, said route data has to be drawn out in a reverse way in the case of a back trip.

Now, a concrete circuit arrangement of the control gate circuit 13c and a shift control circuit 24 in the counter circuit 13 will be described in detail referring to FIG. 7. When data corresponding to the distance is given to the counter 13 while the driver runs his vehicle, carry signals from the counter 18 obtained every 100 meters are supplied to the adder/ subtracter 13b and to a one-shot 24-10. From the one-shot 24-10 is delivered a pulse signal having a pulse width which equals a time interval necessary to shift signals from the first digit to the last one in the shift register 13a. The pulse signal is then sent to an AND circuit 24-12 through an OR circuit 24-8. The gate of the AND circuit 24-12 is opened by said pulse signal and a clock pulse signal CP is supplied through the AND circuit 24-12 to the shift register 13a as a shift pulse signal to shift the contents therein from the first digit to the last one. By this shift operation, the output of the counter 18 is added to the contents of the shift register 13a by means of the adder/subtracter 13b, and the resultant output of the adder/subtracter 13b is again written into the shift register 13a by the shift operation thereof. In this case, the 1 output of an inverter 24-11 enables the gate of the AND gate 13c-2 to open and the contents of the shift register 13a to be shifted.

If, in case the shift register 13a is still stored with data corresponding to a certain distance, a directional instructing signal is generated, and the auxiliary register 11a is not stored with any data at this time whereas the auxiliary register 11b is stored with some data, then the AND circuit 28 has its gate opened, causing the distance data stored in the shift register 13a to be written into the shift register 11.

Figure 4:
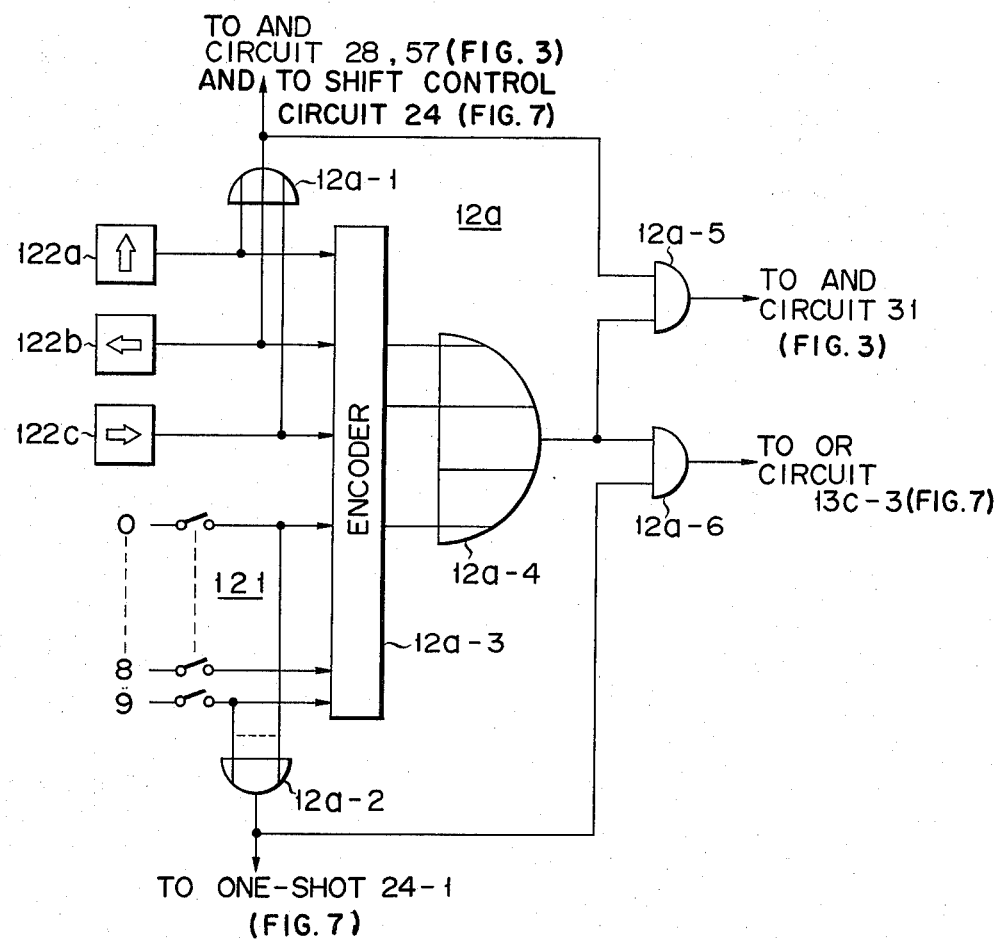
FIG. 4 is a detailed concrete circuit arrangement of the known data input device shown in FIG. 3.

In case of storing data from the already known data input device 12a to the shift register 13a, a shift command signal is supplied to a one-shot 24-1 from the input switch 121 via OR gate 12a-2 shown in FIG. 4, and the distance data signal is supplied to the data input terminal of the shift register 13a through the OR circuit 13c-3. The one-shot 24-1 generates a pulse signal the pulse width of which equals that of the output pulse signal obtained from the one-shot 24-10. The output pulse signal of the one-shot 24-1 is supplied to one input terminal of an AND circuit 24-2. At this time, if a distance data signal has been delivered from any one of the switches 122a, 122b and 122c, a flip-flop 24-4 is already reset to generate a reset signal Q, causing the gate of the AND gate to be opened. Accordingly, the output pulse signal of the one-shot 24-1 is supplied to OR circuits 24-7 and 24-8. The shift operation of the shift register 13a is performed by clock pulses sent from the AND circuit 24-12, and the gate of the AND circuit 13c-2 is closed to render the distance data to be stored in the shift register 13a. Since the output of the one-shot 24-1 is supplied to the set terminal of the flip-flop 24-4 through a delay circuit 24-3, the flip-flop 24-4 is set in a prescribed length of time after the output is delivered from the one-shot 24-1, and the gate of the AND circuit 24-2 is closed.

When the distance data sent from the AND circuit 12a-6 is comprised of one digit numeral expressing for example, 6 km, this one-digit data is stored in the shift register 13a as has been described above, and the data storing operation will be stated in case the distance data consists of two-digits numeral expressing for example, 12 km.

The first digit numeral 1 of the two-digits numeral 12 is stored in the shift register 13a in the similar manner as has been described above. Next, when an output signal of second digit numeral 2 is delivered from the switch 121 following to the first digit numeral 1, an output signal is supplied from the AND circuit 24-5 to a one-shot 24-6 because the flip-flop 24-4 has been already set. The one-shot 24-6 generates a pulse signal having a pulse width smaller by 1 digit than that of the signal obtained from the one-shot 24-10. The output of the one-shot 24-6 is supplied through an OR circuit 24-8 to the AND circuit 24-12. Accordingly, since the number of shifts of the contents in the shift register 13a is smaller by one digit than the case that the shift operation is performed by using the output pulse of the one-shot 24-10, the data already stored in the shift register 13a is shifted upwardly by one digit and said second digit 2 is stored in the digit position succeeding to said first digit 1. The distance data from the already known data input device 12a thus stored in the shift register 13a is combined with the direction data and stored in the shift register 11 in a similar manner to the storing of the data on the practical run of a vehicle.

When a vehicle is driven in accordance with the guiding data stored in the memory device 11, the distance data in the register 11a is supplied to the one input terminal of an AND circuit 13c-1 shown in FIG. 7 through the AND circuit 50 with the existing direction command signal. Because of the existence of the direction command signal and the read-out command signal, a shift signal is supplied to the other terminal of the AND circuit 13c1 and the input terminal of the one-shot 24-9 from the AND circuit 47. The one-shot 24-9 generates a pulse signal having the same width as the pulse signal from the one-shot 24-10 has. The AND circuit 13c-2 is disabled by the pulse signal from the one-shot 24-9, and accordingly, the contents of the register 13a are substituted for the new data sent from the register 11 by the shift pulses delivered from the AND circuit 24-12. Thus, when the read-out command R is delivered, the distance numeral data stored in the register 13a is subtracted one by one by the output pulses of the counter 18 obtained in accordance with the practical run of a vehicle by means of the adder/subtracter 13b.

There will now be described an example where, while a driver is running from point X to point Y, data corresponding to course is recorded in the route guiding apparatus of this invention constructed as described above. The memory device 11 is first cleared before a driver starts from point X, ready to be supplied with a write-in instructing signal W from the switch 123a. Where the driver runs his vehicle under this condition, the pulse generator 17 produces a pulse for each unit of distance covered by the vehicle, and the counter 18 provides data signal for each unit distance coverage. The pulse generator 17 gives forth pulses in synchronization with the rotation of the wheels of the driver's vehicle. The counter 18 of ternary type counts said pulse signals, and generates a carry output data signal 1, each time three pulses are counted for every 100 meters. Data corresponding to the mileage covered by the driver's vehicle is successively added to data stored in the shift register 13a by means of the addition-subtraction device 13b which is not set for addition, causing the register 13 a to be stored with an integrated value of a total actually covered mileage.

Where a driver comes to for example, a forked roadway, the input device 12a gives forth a coded direction-instructing signal to turn, for example, to the right, said coded directional signal being supplied as a gating signal to the AND circuit 28. In the initial stage of the above-mentioned condition, the memory device 11 is not stored with data, and in consequence the code detecting circuit 33a generates a signal denoting the absence of the numerical data in the register 11a. On the other hand, the flip-flop circuit 32 is set by an output from the AND circuit 57, and a write-in instructing signal W is also given to the AND circuit 28. Accordingly, data stored in the shift register 13a, namely, data corresponding to a distance actually covered by a driver's vehicle until it reaches the aforesaid forked roadway is shifted from the AND circuit 28 through the register 11b in the memory device 11. When all data stored in the shift register 13a has been sent, then the code detecting circuit 26 delivers a signal denoting the absence of any numerical data in said register 13a. At this time, the gate of the AND circuit 31 is opened, causing the memory device 11 to store a coded signal denoting a command for "right turn" in succession to the distance data. Namely, the memory device 11 is stored with data corresponding to a total mileage covered by the driver's vehicle until it comes to the first forked roadway and also coded data informing the driver of the direction in which he should run his vehicle at said forked roadway, advising him to turn to the right in the above-mentioned case. The flip-flop circuit 32 is reset after a length of time corresponding to one word due to the absence of any numerical data in the register 13a.

When the operation of storing the memory device 11 with data corresponding to the distance of a particular course of a driver's route expressed in a prescribed unit is brought to an end, the register 13a of the counter circuit 13 is cleared of stored data. Thus, the shift register 13a is again stored with a cumulative actually covered mileage upon receipt of output signals from the pulse generator 17 producing a signal representing a distance actually covered each time by a driver's vehicle and the counter 18. Where the driver's vehicle arrives at the succeeding junction and is desired to pass said junction to the left, then the input device 12a is supplied with a command signal for "left turn" at said junction to produce a coded directional signal, advising the driver to turn to the left. Said coded directional command signal is delivered as a gating signal to the AND circuit 28. The flip-flop circuit 32 is set by an output signal from the AND circuit 38 when the last portion of data stored in the memory device 11 is brought into the auxiliary register 11b. If, in this case, the memory device 11 is formed of a dynamic shift register, then the AND circuit 38 generates an output signal per shifting cycle of data stored in the memory device 11. During the actual run of the driver's vehicle, the flip-flop circuit 32 supplies the memory device 11 with data corresponding to a progressively increasing covered mileage and remains set. However, the flip-flop circuit 32 should be so set as to cause the memory device 11 to be stored with each fresh distance data item in a prescribed timing. In this case, it is advised to provide the AND circuit 57 in the set input circuit of the flip-flop circuit 32 so as to have said AND circuit 57 gated by a directional command signal and set the flip-flop circuit 32 in a timing adapted for the first write-in immediately after the issue of the directional command signal. Namely, the AND circuit 28 has its gate opened with the last portion of data in the memory device still stored in the auxiliary register 11b, and data corresponding to a distance actually covered by a driver's vehicle in the succeeding course of his route until the driver comes to the aforesaid junction at which a directional signal, namely, a command signal for "left turn" has to be issued is stored in the memory device 11 from the shift register 13a in succession to the distance data already stored in said memory device 11. Upon completion of the shifting of said numeral distance data, a coded directional command signal for "left turn" is written into the memory device 11 through the AND circuit 31, causing the flip-flop circuit 32 to be reset.

Where it is previously planned to give a command signal for the direction in which a driver should run his vehicle at each target point for guiding him about his route, for example, a forked roadway or junction, then the memory device 11 is successively stored with data corresponding to the distances between the adjacent target points as well as corresponding to the directions in which the driver should run his vehicle just before entering each successive course of his route. For example, the memory device 11 is stored with data such as "10 km, right " or "2 km, left." These items of data act as a guide to the driver's route.

The counter 36 provided in connection with the memory device 11 is actuated when the detection circuit 33a of the auxiliary register 11a detects directional data to count the number of the already covered ones of the respective courses of a driver's route divided by the directional data stored in the memory device 11. The counter 36 is reset upon receipt of an output signal from the AND circuit 35 per shifting cycle of data in the memory device 11. The counts made by said counter 36 represent the sequential positions of the covered courses shifted from the register 11a, namely, the addresses of data.

Where data corresponding to a route between points X and Y is automatically recorded while a driver is running his vehicle on his outward trip from point X to point Y, then the driver can be accurately guided on his return trip from point Y to point X by driving his vehicle in accordance with data corresponding to said route read out from a memory device 11 in a reverse way. In the driver's outward trip, the memory device 11 is stored with data on his route in the order of distance-direction-distance-direction, and the last portion of said stored data normally ends with data corresponding to the mileage of the last course of the driver's route. When, therefore, the stored data is read out reversely from the last portion, it should be noted that data corresponding to a given direction read out after data corresponding to the preceding distance (as viewed from the driver's return trip) represents the direction in which the driver should run his vehicle just before entering a course following that which is denoted by said preceding distance. Further, the driver should take his course in accordance with an automatically reversed directional command signal.

When a driver makes a return trip from point Y to point X, a return trip-instructing signal B and a read-out-instructing signal R are generated together by operating the switches 123c, 123b respectively. If, in the case the return trip-instructing signal (i.e., back command B) is issued, the delay circuit 43 does not give forth an output signal, the last portion of data stored in the memory device is still retained in the auxiliary register 11b, and the counts made by the counter 36 coincide with the number of the covered courses of a driver's route stored in the memory device 11, then the AND circuit 38 generates an output signal. At this time, the AND circuit 41 has its gate opened, causing the counts made by the counter 36 to be set in the counter 42. Namely, the counts set in the counter 42 coincide with the number of the covered courses of the driver's route stored in the memory device 11. When the return trip-instructing signal B is produced, the counter 42 is made ready for subtraction, and progressively subtracts the already set counts, each time an AND circuit 45 delivers an output signal.

Where a directional command signal is given under the above-mentioned condition, the AND circuit 45 produces an output signal, because a read-out-instructing signal R is already given. Now let it be assumed that the number of the covered courses of a driver's route stored in the memory device 11 is $n$. Then the counts preset in the counter 42 are chosen to be ($n$-1). When the counts preset in the counter 36 fall to ($n$-1) as the result of shifting of data in the memory device 11, the coincidence detection circuit 46 generates an output signal, which in turn is supplied as a gating signal to the AND circuit 48. At this time, the AND circuit 48 is supplied with a return trip-instructing signal B, read-out-instructing signal R and directional command signal all at the same time. Since the delay circuit 49 still produces an output signal O, the inverter 51 gives forth an output signal 1. Accordingly, that portion of the data stored in the auxiliary register 11a which denotes a directional command signal is drawn out of the AND circuit 48, through the OR circuit 29. Said directional command signal is indicated on the display device 16 as a guide for the driver. Since the display device 16 is set, as shown in FIG. 6, for a return trip, namely, to reverse the right and left directions, a coded signal instructing "right turn" is indicated in the reverse form of "left turn" on the display device 16.

The memory device 11 is initially stored with data corresponding to a driver's route in the order of distance-direction-distance-direction. Where, therefore, the counter 26 counts a number of ($n$-1), the memory device 11 is stored with data corresponding to the mileage of the last course of a driver's route and data corresponding to a directional command signal following said distance data. Said directional command signal indicated on the display device 16 represents the direction in which a driver should run his vehicle just before entering a course following the last course (as viewed from his return trip).

When the coincidence detection circuit 46 produces an output coincidence signal, the AND circuit 47 is supplied with said coincidence signal as well as with a gating signal after the delay time of the delay circuit 49, for example, after a directional command signal is read out. The AND circuit 47 which is supplied with a directional command signal and read-out-instructing signal R at the same time delivers a gating signal to the AND circuit 50 and a shift-instructing signal to the shift control circuit 24 of the counter circuit 13. At this time, the AND circuit 50 causes distance data stored in the auxiliary register 11a to be written in the shift register 13a through the gate control circuit 13c. Namely, distance data constituting the last portion of data initially stored in the memory device 11 during a driver's outward trip is written in the shift register 13a, and indicated on the display device 16 through the detection circuit 26. As previously mentioned, the display device 16 presents a directional guide corresponding to the above-mentioned distance data, namely, instructing a driver to follow said displayed directional guide after running through the distance represented by the displayed distance data. Upon completion of the read-out of data corresponding to the distance and direction, the counter 36 is operated by the succeeding directional data, and in consequence the AND circuit 47 has its gate closed.

In a driver's back trip assisted by the above-mentioned guiding means, read-out from the addition-subtraction device 13b of the counter circuit 13 is made in the subtracted form. Thus, distance data stored in the shift register 13a is progressively subtracted in accordance with data from the counter 18 denoting the mileage covered by a driver's vehicle. Namely, distance data indicated on the display device 16 represents a noncovered distance to the boundary of the succeeding course of a driver's route corresponding to the displayed directional guide. For example, a directional guide "left turn" indicated on the display device 16 instructs a driver to turn the left when the remaining distance is reduced to zero. The display of a remaining distance provides an effective route guide. Where the unfinished distance decreases from a specified level, as indicated by the detection circuit 26, for example, becomes smaller than 1 kilometer, then a signal is supplied to the AND circuit 25, warning a driver about his approach to a displayed guide point either by an alarm device AL or by the flickering of an indication on the display device 16.

Thereafter directional command signals are generated in turn, and data stored in the memory device 11 is successively read out for display reversely from the last portion, with the addresses designated by the counter 42, thereby effectively guiding a driver on his return trip through the same route as in his onward trip.

Where it is desired to guide a driver in his one-way trip through the same route from point X to point Y, it will be sufficient simply to produce a read-out-instructing signal from the control input device 56 and give forth a directional command signal for each course of a driver's route. In this case, the counter 42 need not be preset at a maximum number of counts made by the counter 36, but is only made to count up increasingly from zero for each directional command signal displayed. As previously described, the counter 42 acts to designate the memory address from which data stored in the memory device 11 is to be read out. Namely, distance data whose address is designated by said counter 42 is written in the counter circuit 13 upon receipt of an output coincidence signal from the coincidence circuit 46. Since, in the above-mentioned case, it is unnecessary to indicate data corresponding to a driver's route in his return trip, the AND circuit 53 has its gate opened when the delay circuit 49 generates an output signal and the coincidence detection circuit 46 ceases to produce any output signal, namely, when distance data and following directional data stored in the counter circuit 13 are drawn out of the auxiliary register 11a, thereby causing the aforesaid directional data to be presented on the display device 16. Thereafter, indications on said display device 16 are successively changed for each directional data, providing an effective route guide.

The foregoing description refers to the case where the memory device 11 is stored with data corresponding to the distances covered by the actual run of a driver's vehicle through a route of which a driver has been uninformed, thereby effectively guiding him about said route on his return trip. In practice, however, it is often considered necessary to accurately guide a driver in a one-way trip to an unknown destination. In such case, it is advisable to divide a route to a driver's destination into suitable sub-courses with reference to, for example, a map and manually store in the memory device 11 data corresponding to the distances of the respective divided sub-courses as well as corresponding to the direction in which a driver should run his vehicle just before entering each succeeding sub-course, using the known data input device 12a. This process utilizing reference to a map can provide reliable route guiding before a driver operates his vehicle. If, in such case, the map indicates such a series of numbers denoting the mileages of the respective courses of a given route as is adapted to be used as input data for the aforesaid input device 12a, then greater advantage will be obtained in preparing a good route guide. Further, if coded data is previously impressed on a map, and said data is electronically recorded for use as input data for the above-mentioned input device 12a, then said input can be automatically effected. If a plurality of memory devices 11 are provided in advance to guide a driver about the routes to the specified destinations, then said memory devices 11 can be interchangeably used according to the selected destination.

According to the foregoing description, data corresponding to the distances and directions was alternately stored in series in a single memory device 11. However, it is obviously possible to provide separate memory devices 11 for distances and directions. This arrangement not only simplifies the read-out of data particularly on a return trip, but also eliminates the necessity of controlling the read-out of a series of data so as to separate data corresponding to distances from data corresponding to directions, namely, enables both groups of data to be read out in parallel.

According to the foregoing embodiment, the display device 16 was designed to indicate the remaining mileage of a given course of a driver's route which a driver should cover before be reaches the succeeding course and the direction in which he should run his vehicle just before entering said succeeding course. Generally, however, required turns or straight runs at the respective target points can be understood with relative ease, for example, from a map. Therefore, mere numerical indication of the mileages of the respective courses of a driver's route will fully attain the object of providing a good route guide. This arrangement eliminates the necessity of installing a mechanism for storing and displaying directional data and a subtraction device, and, when applied, for example to a bicycle, displays a prominent effect. Where a given course has a long remaining mileage to be covered by a driver, data corresponding to said remaining course is practically unnecessary. In such case, the object of a route guide will be fully attained simply by informing a driver of his approach to a specified course when he comes to a point at which a warning would have to be given to him according to the foregoing embodiment. If said approach is indicated by a directional command presented on the display device 16, then judgement by a driver of data on his route will be considerably simplified, unless a plurality of directional commands still have to be given before a driver reaches said specified course. Further, the above-mentioned approach may obviously be notified to a driver by indication of a remaining mileage instead of a directional command.

A route guiding apparatus according to the above-mentioned embodiment displayed "right turn," "left turn" and "straight run" by means of marks. In an actual roadway, however, complicated forked portions sometimes appear. In such case, an effective route guide may be attained by providing marks of oblique rightward and leftward runs in addition to the aforesaid three marks. It is also advisable to provide a single display panel with a plurality of digits, for example, 1,2,3,4,5 arranged as counted from the left side of the display panel in a pattern resembling a complicated forked roadway and, where a driver is instructed to take the first course from the left, display the digit [1].

As mentioned above, this invention provides a route guiding apparatus capable of furnishing a driver of an automobile, motorcycle or bicycle with reliable data on his route, thereby reliably guiding him even to a destination of which he is uninformed. Accordingly, the subject route guiding apparatus can be applied very advantageously in a trip or various business activities utilizing vehicles, for example, an automobile or bicycle.

According to the aforegoing embodiment, data corresponding to the respective courses of a driver's route is indicated in the form denoting distances and directions. However, it is possible to designate the respective courses by sequential numbers and use said numbers as those of memory addresses. If said sequential numbers are presented on the display section 163 of FIG. 2, then a driver can be accurately informed of those courses of his route which he has already covered and also be reliably guided about the remaining courses of which he may be uninformed, because data stored in the memory address designated by any selected one of the aforesaid sequential numbers can be readily read out.

What is claimed is:
1. A route guiding apparatus comprising:
means for generating pulses as a function of the rotation of the wheels of a vehicle such as an automobile, a motorcycle, a bicycle or the like, for each specified increment of distance covered by said vehicle;
counting means coupled to said pulse generating means for counting the pulses from said pulse generating means so as to measure the distance covered by said vehicle;
first indicating means coupled to said counting means for displaying a distance data item corresponding to the covered distance obtained by said counting means;
input means for supplying a direction data item indicating "right turn," "left turn" or "go-straight" guiding
write-in means coupled to said input means for pairing said distance data and said direction data item into a route segment data item upon receipt of said direction data from said input means;
memory means coupled to said write-in means for sequentially storing a plurality of route segment data items from said write-in means;
instructing means for instructing read-out of the route segment data items from said memory means;
read-out means responsive to instructions from said instructing means for reading out controllably and sequentially a plurality of route segment data items from said memory means, each route segment data item including a distance data item corresponding to the distance of a route segment to be covered by said vehicle and a direction data item corresponding to the direction of the next route segment to be covered;
second indicating means coupled to said memory means for displaying the direction data item read out from said memory means; and
third indicating means coupled to said memory means for displaying the remaining distance of a route segment and including means for reducing the number of pulses defining the distance data item read out by said read-out means as the vehicle advances along the route segment to generate signals corresponding to said remaining distance of a route segment.

2. A route guiding apparatus according to claim 1, wherein said write-in means includes: a first input terminal coupled to receive said data corresponding to the covered distance from said counting means; a second input terminal coupled to receive the direction data item from said input means; and an AND gate coupled to said input terminals to supply said data corresponding to the covered distance to said memory means when said second input terminal receives said direction data item.

3. A route guiding apparatus according to claim 1, wherein said write-in means includes a switch to form a write-in command signal; a first input terminal coupled to receive a said write-in command signal from said switch; a second input terminal coupled to receive said data corresponding to the covered distance from said counting means; a third input terminal coupled to receive said direction data item from said input means; and an AND gate coupled to said input terminals to supply said data corresponding to the covered distance to said memory means when said first and third input terminals receive said write-in command signal and said direction data item, respectively.

4. A route guiding apparatus according to claim 1, wherein: said read-out means includes a switch to form a read-out command signal; a first AND gate having a first input terminal coupled to receive said read-out command signal from said switch and a second input terminal coupled to receive said direction data item from said input means; a direction data memory to store said direction data item from said first AND gate; a second AND gate having a first input terminal coupled to receive said data corresponding to the covered distance from said memory means and a second input terminal coupled to receive said readout command signal from said switch; and a counter coupled to said second AND gate to receive said data corresponding to the covered distance from said second AND gate.

5. A route guiding apparatus according to claim 1 comprising further counting means coupled to said memory means for counting the number of route segment data items and means coupled to said further counting means for displaying the counted number of route segment data items as a route segment number, together with said data corresponding to the covered distance and said direction data item.

6. A route guiding apparatus according to claim 1, wherein the vehicle includes a direction indicator, and wherein said input means is coupled to and co-acts with said direction indicator of the vehicle.

7. A route guiding apparatus according to claim 1 further comprising alarm means coupled to said third indicating means for emitting an alarm when said data corresponding to the remaining distance of a route segment has a value lower than a predetermined value while the distance data is read out from said memory means.

8. A route guiding apparatus comprising:
means for generating pulses as a function of the rotation of the wheels of a vehicle such as an automobile, a motorcycle, a bicycle or the like, for each specified increment of distance covered by said vehicle;
counting means coupled to said pulse generating means for counting the pulses from said pulse generating means so as to measure the distance covered by said vehicle;
first indicating means coupled to said counting means for displaying a distance data item corresponding to the covered distance obtained by said counting means;
input means for supplying a direction data item indicating "right turn," "left turn," or "go-straight" guiding;
write-in means coupled to said input means for pairing said distance data and said direction data item into a route segment data item upon receipt of said direction data from said input means;
memory means coupled to said write-in means for sequentially storing a plurality of route segment data items from said write-in means;
instructing means for instructing read-out of the route segment data items from said memory means in the opposite order to the order in which said route segment data items have been stored in said memory means;
read-out means responsive to instructions from said instructing means for reading out from said memory means a plurality of route segment data items, each route segment data item including a distance data item corresponding to the distance of a route segment to be covered by said vehicle and a direction data item corresponding to the direction of the next route segment to be covered, said route segment data items being read out from said memory means controllably and sequentially in the opposite order to the order in which said route segment data items have been stored in said memory means;
second indicating means coupled to said memory means for displaying an opposite direction data to the direction data read out from said memory means; and
third indicating means for displaying the remaining distance of a route segment and including means for reducing the number of pulses defining the distance data item read out by said read-out means as the vehicle advances along the route segment to generate signals corresponding to said remaining distance of a route segment.

9. A route guiding apparatus according to claim 8, wherein said write-in means includes: a first input terminal to receive said data corresponding to the covered distance from said counting means; a second input terminal coupled to receive the direction data item from said input means; and an AND gate coupled to said input terminals to supply said data corresponding to the covered distance to said memory means when said second input terminal receives said direction data item.

10. A route guiding apparatus according to claim 8, wherein said write-in means includes a switch to form a write-in command signal; a first input terminal coupled to receive said write-in command signal from said switch; a second input terminal coupled to receive said data corresponding to the covered distance from said counting means; a third input terminal coupled to receive said direction data item from said input means; and an AND gate coupled to said input terminals to supply said data corresponding to the covered distance to said memory means when said first and third input terminals receive said write-in command signal and said direction data item, respectively.

11. A route guiding apparatus according to claim 8, wherein said read-out means includes a switch to form a read-out command signal; a first AND gate having a first input terminal coupled to receive said read-out command signal from said switch and a second input terminal coupled to receive said direction data item from said input means; a direction data memory to store said direction data item from said first AND gate; a second AND gate having a first input terminal coupled to receive said data corresponding to the covered distance from said memory means and a second input terminal coupled to receive said read-out command signal from said switch; and a counter coupled to said second AND gate to receive said data corresponding to the covered distance from said second AND gate.

12. A route guiding apparatus according to claim 8 comprising further counting means coupled to said memory means for counting the number of route segment data items and means coupled to said further counting means for displaying the counted number of route segment data items as a route segment number, together with said data corresponding to the covered distance and said direction data item.

13. A route guiding apparatus according to claim 8, wherein the vehicle includes a direction indicator, and wherein said input means is coupled to and co-acts with said direction indicator of the vehicle.

14. A route guiding apparatus according to claim 8 further comprising alarm means coupled to said third indicating means for emitting an alarm when said data corresponding to the remaining distance of a route segment has a value lower than a predetermined value while the distance data is read out from said memory means.

15. A route guiding apparatus comprising:
means for generating pulses as a function of the rotation of the wheels of a vehicle such as an automobile, a motorcycle, a bicycle or the like, for each specified increment of distance covered by said vehicle;
counting means coupled to said pulse generating means for counting the distance pulses from said pulse generating means so as to measure the distance covered by said vehicle;
first indicating means coupled to said counting means for displaying a distance data item corresponding to the covered distance obtained by said counting means;
key input means for supplying a distance data item corresponding to the distance of a route segment to be covered by the vehicle and a direction data item corresponding to the direction of the next route segment;
write-in means coupled to said key input means for pairing said distance data item and said direction data item into a route segment data item upon receipt of said direction data item from said key input means;
memory means coupled to said write-in means for sequentially storing a plurality of route segment data items from said write-in means;
instructing means for instructing read-out of the route segment data items from said memory means;
read-out means responsive to instructions from said instructing means for reading out controllably and sequentially a plurality of route segment data items from said memory means, each route segment data item including a distance data item corresponding to the distance of a route segment to be covered by said vehicle and a direction data item corresponding to the direction of the next route segment to be covered;
second indicating means coupled to said memory means for displaying the direction data item read out from said read-out means; and
third indicating means for displaying the remaining distance of a route segment and including means for reducing the number of pulses defining the distance data item read out by said read-out means as the vehicle advances along the route segment to generate signals corresponding to said remaining distance of a route segment.

* * * * *

UNITED STATES PATENT AND TRADEMARK OFFICE
CERTIFICATE OF CORRECTION

PATENT NO. : 3,925,641
DATED : December 9, 1975
INVENTOR(S) : Toshio KASHIO

It is certified that error appears in the above-identified patent and that said Letters Patent are hereby corrected as shown below:

On the initial page of the patent, change the address of the Assignee from "Higashiyamato, Japan" to --Tokyo, Japan--.

Signed and Sealed this sixth Day of April 1976

[SEAL]

Attest:

RUTH C. MASON
*Attesting Officer*

C. MARSHALL DANN
*Commissioner of Patents and Trademarks*